(12) United States Patent
Friedman (10) Patent No.: US 7,039,125 B2
(45) Date of Patent: May 2, 2006

(54) EQUALIZED SNR POWER BACK-OFF

(75) Inventor: Vladimir Friedman, South Plains, NJ (US)

(73) Assignee: Analog Devices, Inc., Norwood, MA (US)

( * ) Notice: Subject to any disclaimer, the term of this patent is extended or adjusted under 35 U.S.C. 154(b) by 642 days.

(21) Appl. No.: 10/077,541

(22) Filed: Feb. 15, 2002

(65) Prior Publication Data
US 2002/0163974 A1 Nov. 7, 2002

Related U.S. Application Data (60) Provisional application No. 60/275,179, filed on Mar. 12, 2001.

(51) Int. Cl.
*H04K 1/02* (2006.01)
*H04L 25/03* (2006.01)

(52) U.S. Cl. ........................ 375/297; 375/296

(58) Field of Classification Search ............... 375/295, 375/297, 259
See application file for complete search history.

(56) References Cited

U.S. PATENT DOCUMENTS

| | | | |
|---|---|---|---|
| 5,574,747 A * | 11/1996 | Lomp | 375/144 |
| 6,252,915 B1 * | 6/2001 | Mollenkopf et al. | 375/297 |
| 6,370,187 B1 * | 4/2002 | Agah | 375/219 |
| 6,377,786 B1 * | 4/2002 | Mollenkopf et al. | 455/127.2 |
| 6,633,766 B1 * | 10/2003 | van der Pol | 455/522 |
| 6,741,867 B1 * | 5/2004 | Tetsuya | 455/522 |

OTHER PUBLICATIONS

"G.vdsl: Proposal for Upstream Power Back-Off for VDSL," Krista S. Jacobsen. *Texas Instruments: ITU-Telecommunication Standardization Sector*. Jan. 1999.
"G.vdsl: The Impact of Upstream Power Back-Off on VDSL Frequency Planning," Krista S. Jacobsen. *Texas Instruments: ITU-Telecommunication Standardization Sector*. Aug. 1999.
"G.vdsl: 'Constant Average Log:' Robust New Power Back-Off Method," Yaron Rashi. *Infineon Technologies*. Apr. 2000.
"Simulation Results for Reference Length Length and Equalized FEXT PBO," Sigurd Schelstraete. *Alcatel*. Aug. 2000.
"Multiple Reference Lengths in UPBO," Sigurd Schelstraete. *Alcatel*. Aug. 2000.
"The Effect of Binder Topology on PBO Performance," Sigurd Schelstraete. *Alcatel*. Aug. 2000.

\* cited by examiner

*Primary Examiner*—Jay K Patel
*Assistant Examiner*—Qutub Ghulamali
(74) *Attorney, Agent, or Firm*—Gauthier & Connors (57) ABSTRACT

A power back-off system and method to mitigate far-end crosstalk interference between channels in a communication system through a generalization of the reference length and equalized FEXT methods, a power back-off method is provided that allows for control over the SNR of the channels by trading SNR on shorter channels against SNR on the longer channels. The generalization also provides for a power back-off method that can provide for two or more data rate service areas.

21 Claims, 9 Drawing Sheets

EQUALIZED SNR POWER BACK-OFF

PRIORITY INFORMATION

This application claims priority to provisional application Ser. No. 60/275,179 entitled "Equalized SNR Power Back-Off Method" filed on Mar. 12, 2001, which is incorporated herein by reference in its entirety.

BACKGROUND OF THE INVENTION

The invention relates to the field of communication systems, and in particular to mitigating the effects of far-end crosstalk noise in communication systems.

The Very High-speed Digital Subscriber Line is a service that allows distribution of high data rates (currently 23 Mb/sec downstream, 3 Mb/sec upstream for asymmetrical services, 13 Mb/sec for symmetrical services) using the present twisted-pair copper infrastructure. Typically, optical fiber is used to transport data to the residential area. From there, data is transmitted over the present copper infrastructure. Standardization efforts of this technology are currently under way in US (ANSI T1E1), Europe (ETSI) and International Telecommunication Union (ITU).

Figure 1A:
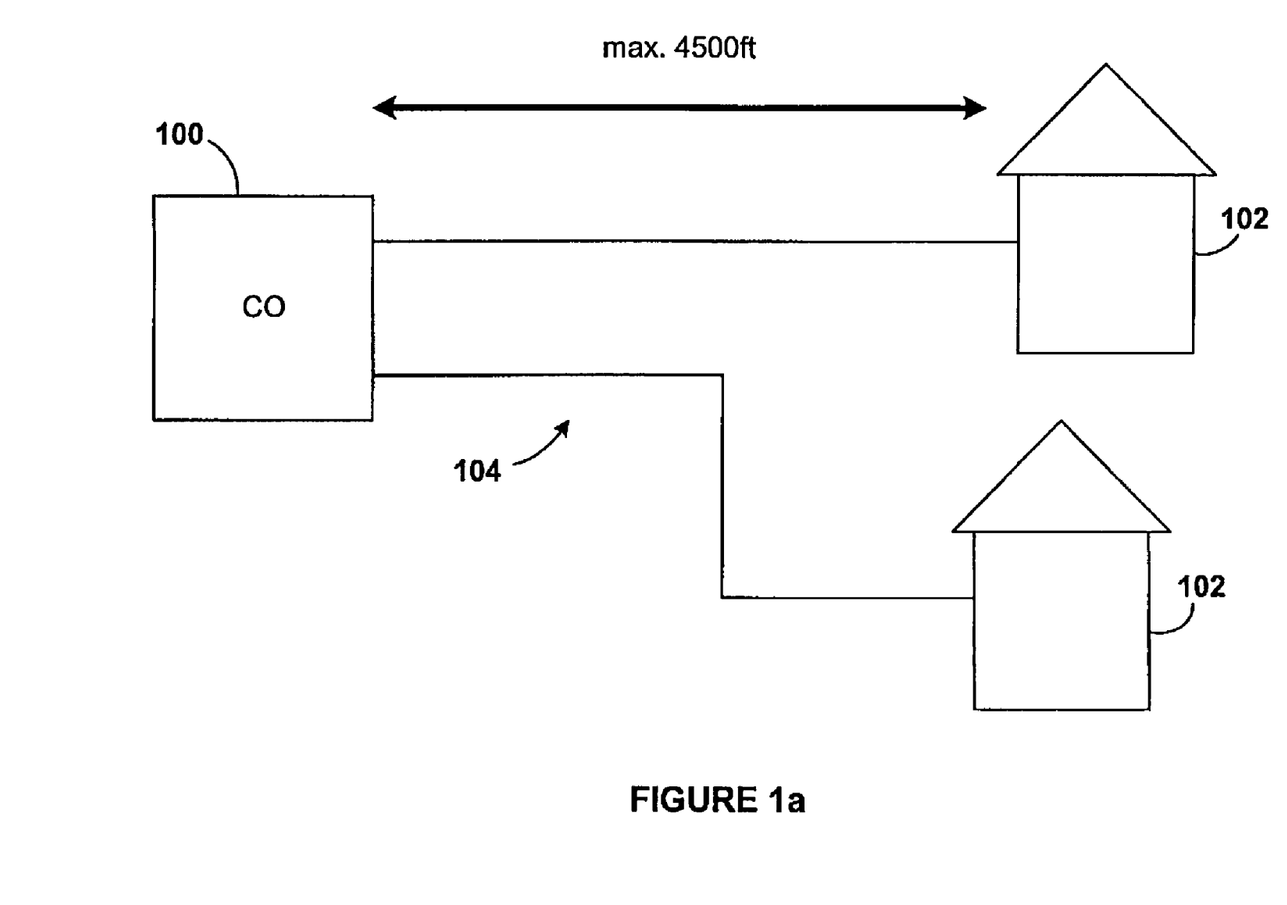
FIG. 1a illustrates a fiber-to-exchange configuration for VDSL.
Figure 1B:
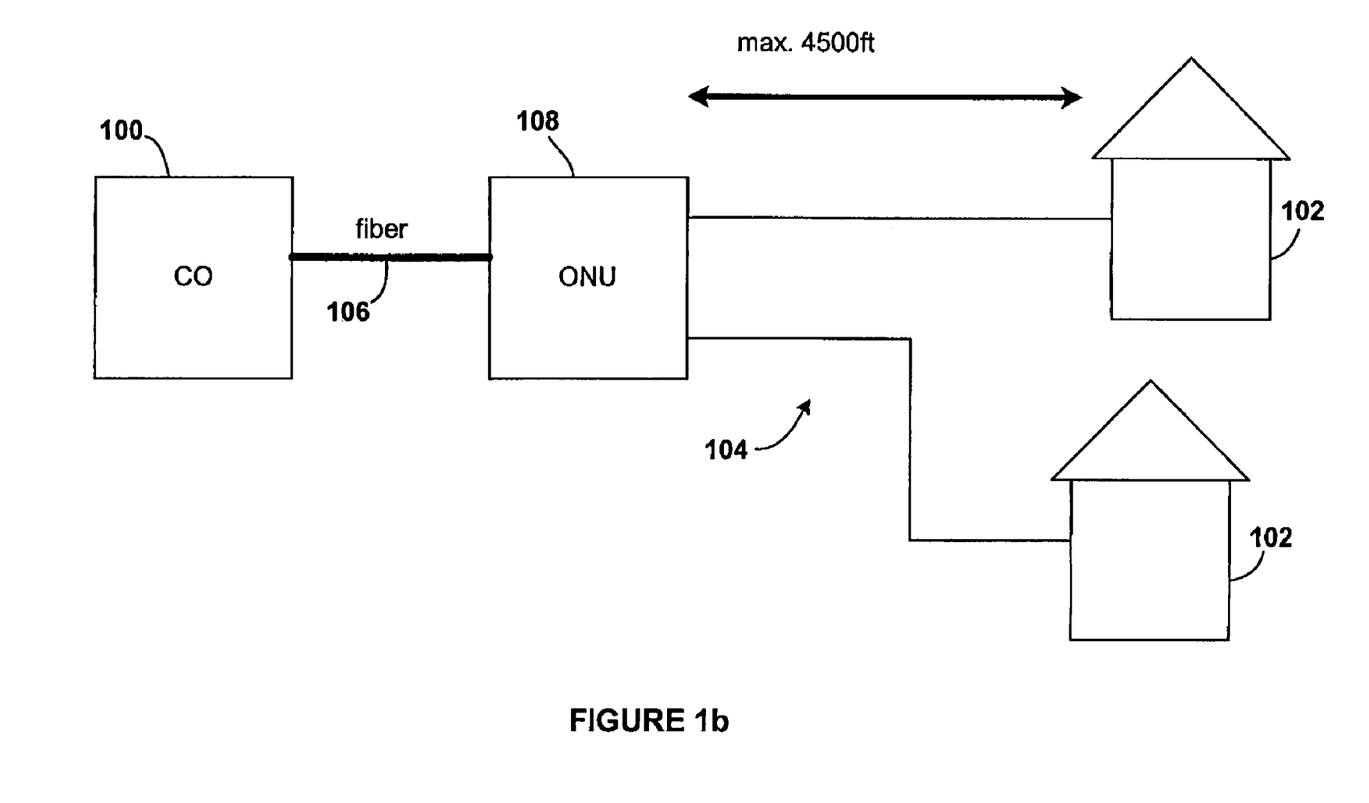
FIG. 1b illustrates a fiber-to-cabinet configuration for VDSL.

Due to the large attenuation of high frequency signals on the twisted-pair lines, the deployment of VDSL is limited to a radius of less than 4500 feet from the signal source. This results in generally two possible configurations for VDSL. FIG. 1a illustrates a so-called fiber-to-exchange configuration (FTTEx) for customers 102 close to the central office (CO) 100 (within about 4500 ft). In this case, VDSL is deployed across the present twisted-pair copper infrastructure 104 from CO 100. For the rest of the customers, VDSL is deployed using a so-called fiber-to-the-cabinet configuration (FTTCab) as illustrated in FIG. 1b. In this case, optical fiber 106 is run from CO 100 to an optical network unit (ONU) 108. VDSL is then deployed to customers 102 from ONU 108 across the copper infrastructure 104.

The band allocation for upstream VDSL starts at 2.5 MHz. As a result, far-end crosstalk (FEXT) noise is the dominant crosstalk noise source. In general, telephone loops disposed adjacent to each other and carrying signals at the same frequencies often create cross-talk interference in their neighboring channels. FEXT noise is the crosstalk noise generated by signals traveling in the same direction in the adjacent loops. The FEXT noise power spectral density (PSD) in a telephone loop due to a neighboring interferer, k, is equal to:

$$PSD_{FEXT} = k_F \cdot f^2 \cdot S(f, l_k) \cdot |H(f, l_k)|^2 \cdot l_s$$

where $k_F$=constant;
f—frequency (Hz);
$S(f,l_k)$—transmit PSD of the interferer;
$H(f,l_k)$—transfer function of the interferer channel;
$l_s$—the length of the cable segment where the two signals run in parallel. For an upstream VDSL environment this is generally given by the loop length of the unit placed closer to the ONU/CO, whether interferer or interfered.

As can be seen, the $PSD_{FEXT}$ depends on the frequency, the length of the cable segment where the two signals run in parallel, and the channel transfer function. Generally, the channel transfer function is an exponentially decreasing function of $l_k$. Accordingly, in an upstream VDSL environment, an interferer located close to the ONU/CO will inject significant noise over the attenuated signal on a long loop. This is further described with reference to FIG. 2.

Figure 2:
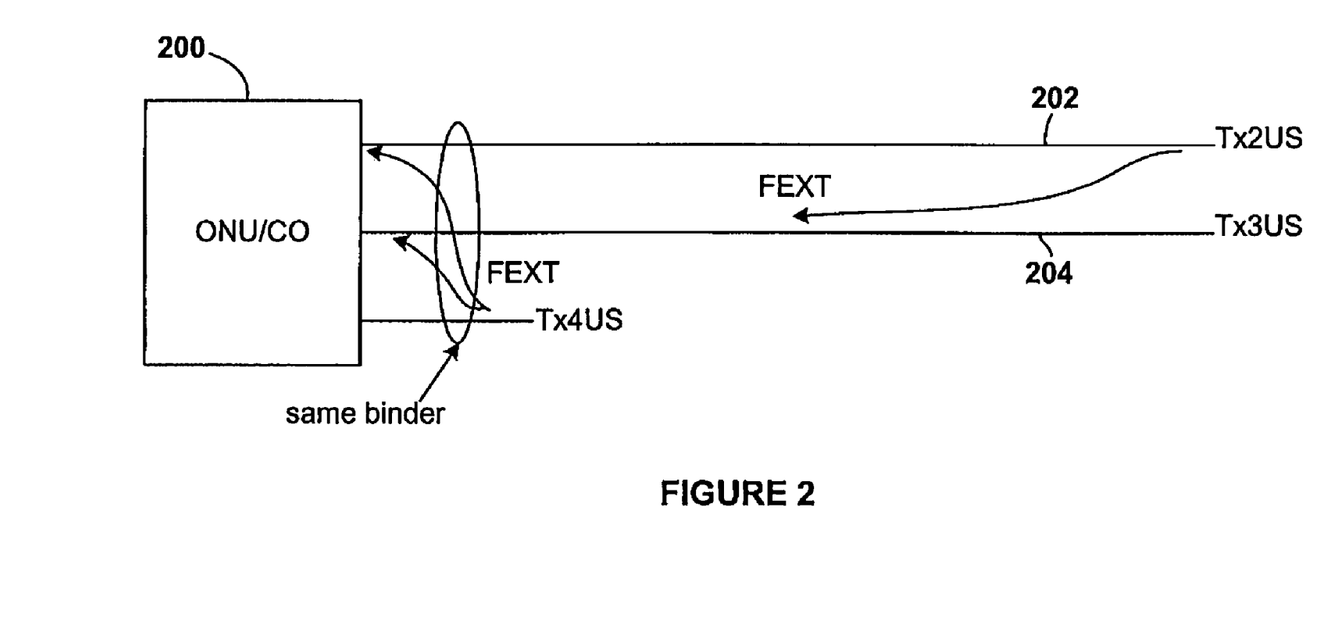
FIG. 2 illustrates neighboring loops injecting FEXT noise into loops on the same binder.

Generally, FIG. 2 illustrates neighboring loops injecting FEXT noise into loops on the same binder. In the upstream direction (from customer transmitter to the ONU/CO), transmitter Tx4US is much closer to ONU/CO 200 than Tx2US and Tx3US. Tx4US will inject a relatively high level of FEXT noise in the copper pairs 202 and 204 collocated in the same cable binder. The upstream signals from these pairs, 202 and 204, are heavily attenuated at the point where the FEXT noise injection occurs. The result is that, in the upstream direction, the FEXT noise from source Tx4US, close to the ONU/CO 200, will significantly degrade the SNR of the sources Tx2US and Tx3US farther away from ONU/CO 200 and collocated on the cable binder. Generally, this problem does not exist in the downstream direction (all the transmitters are located at ONU/CO 200).

The performance degradation on long loops can be mitigated by a power back-off mechanism, which reduces the transmit power on shorter loops. Several methods have been proposed for a power back-off mechanism. A method that takes into account an environment in which both FEXT and near-end crosstalk (NEXT) are present is given in C. Hwang, K. Kim, "The Analysis of a New Power Back-Off Method," ITU contribution FI-120, February 2000. A review of the proposed methods in a FEXT dominated environment is given in Krista S. Jacobsen, "Proposal for Upstream Power Back-Off for VDSL," ITU contribution FI-075, February 2000. Two such methods for FEXT dominated environments are the reference length method and the equalized FEXT method.

The reference length method adjusts the transmitter power such that the received signal power at the ONU/CO is equal for any loop. For the reference length power back-off method, the transmit power spectral density of an interferer k, $S(f,l_k)$, is controlled to be:

$$S(f, l_k) = \frac{S(f, l_R) \cdot |H(f, l_R)|^2}{|H(f, l_k)|^2}$$

for a channel length $l_k \leq l_R$, where $l_R$ is a reference channel length, $H(f,l_R)$ is a reference channel transfer function and $S(f,l_R)$ is a reference transmit power spectral density. The reference transmit power spectral density is typically set to the maximum allowed transmit power spectral density, and, in a VDSL environment, is typically set by the standards committee. The reference channel length is typically defined by the system operator to correspond to a target length over which the operator wishes to provide a certain level of service. Thus, for instance, the reference length may be the length of the longest loop in a binder if the operator wishes to provide the level of service to all units on the binder. Generally, if the reference length is shorter than the length of the longest loop in the binder, then all units at a distance farther than the reference length transmit with a power spectral density equal to the reference power spectral density. The reference transfer function, $H(f,l_R)$, can be calculated based on the reference loop length and the type of wire used in the system.

Figure 3:
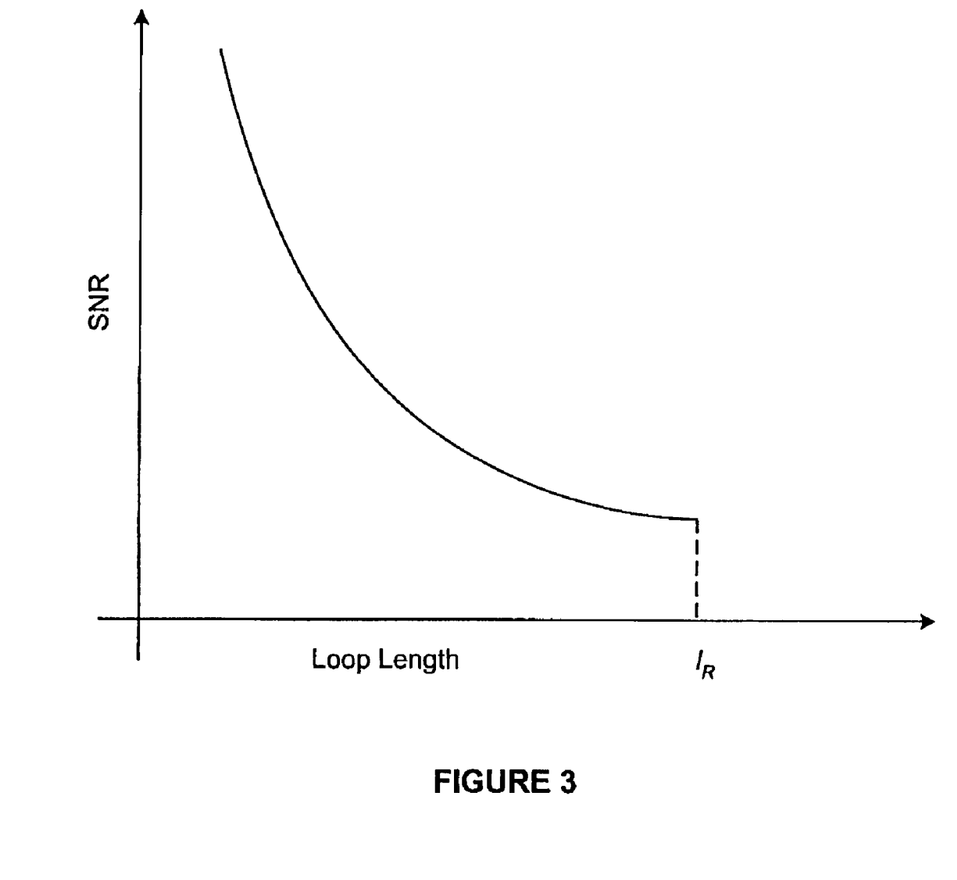
FIG. 3 illustrates a distribution of the signal to noise ratio (SNR) and data rate as a function of loop length for a reference length power back-off method.

For the reference length method, the received signal power is identical for each loop. FEXT noise, however, is not. The longest loop is still affected more than the rest because the length of the shared portion of the cable is proportional with the loop lengths of all the other interferers, while for the shortest loop the shared portion of the cable is the length of the loop itself. The distribution of the signal to noise ratio (SNR) (and, hence, the data rate) as a function of loop length looks like that shown in FIG. 3. Thus, the data rate is considerably higher for units closer to the ONU/CO than for units that are far away.

The equalized FEXT method adjusts the transmitter power such that the FEXT noise measured at the ONU is equal for any loop, i.e. the PSD of the FEXT noise is independent of the loop length. For the equalized FEXT power back-off method, the transmit power spectral density of an interferer k is controlled to be:

$$S(f, l_k) = \frac{S(f, l_R) \cdot |H(f, l_R)|^2 \cdot l_R}{|H(f, l_k)|^2 \cdot l_k} \text{ for } l_k \leq l_R$$

For an extremely short loop in the equalized FEXT method, the transmit PSD, $S(f,l_k)$, must be extremely high for the above relationship to hold. The received signal power for the short loops will be considerably higher than for long loops and, as a result, the SNR (and data rate) distribution as a function of loop length is similar to that of FIG. 3. However, the imbalance between the data rate on short loops compared with the data rate on long loops is even higher in the reference length method.

Like the reference length method and the equalized FEXT method, other power back-off methods provide for a SNR that varies with the loop length. Consequently, none of the prior methods provide a substantially equal data rate for all loop lengths. Nor do these methods teach how to control the upstream SNR, and consequently, upstream data rates in a VDSL environment. Furthermore, none of the prior methods provide for two (or more) data rate service areas based on differing transmit PSDs.

SUMMARY OF THE INVENTION

In one aspect of the present invention, a power back-off method to mitigate the effects of FEXT noise in a communication system is provided. The communication system comprises at least one transmitter k. The transmitter k transmits to a central site via a corresponding channel. The method comprises controlling the transmit power spectral density of the transmitter k, $S(f,l_k)$, according to:

$$S(f, l_k) = \left(\frac{l_k}{l_R}\right)^v \frac{S(f, l_R) \cdot |H(f, l_R)|^2}{|H(f, l_k)|^2} \text{ for } l_k \leq l_R$$

wherein $l_k$ is a channel length of the channel corresponding to the transmitter k, $H(f,l_k)$ is a channel transfer function of the channel corresponding to the transmitter k, $l_R$ is a reference channel length, $H(f,l_R)$ is a reference channel transfer function, $S(f,l_R)$ is a reference transmit power spectral density, and $v \neq -1$ or 0.

In another aspect of the present invention, a communication system is provided. The communication system comprises at least one transmitter k. The transmitter transmits to the central site with a transmit power spectral density $S(f,l_k)$ via a corresponding channel. The channel has a length $l_k$ and a channel transfer function $H(f,l_k)$. The transmit power spectral density $S(f,l_k)$ is governed according to:

$$S(f, l_k) = \left(\frac{l_k}{l_R}\right)^v \frac{S(f, l_R) \cdot |H(f, l_R)|^2}{|H(f, l_k)|^2} \text{ for } l_k \leq l_R$$

where $l_R$ is a reference channel length, $H(f,l_R)$ is a reference channel transfer function, $S(f,l_R)$ is a reference transmit power spectral density, and $v \neq -1$ or 0.

Another aspect of the present invention provides a transmitter that transmits on a channel with a transmit power spectral density $S(f,l_k)$ according to:

$$S(f, l_k) = \left(\frac{l_k}{l_R}\right)^v \frac{S(f, l_R) \cdot |H(f, l_R)|^2}{|H(f, l_k)|^2} \text{ for } l_k \leq l_R$$

wherein $l_k$ is a channel length of the channel, $H(f,l_k)$ is a channel transfer function of the channel, $S(f,l_R)$ is the reference transmit power spectral density, $l_R$ is a reference channel length, $H(f,l_R)$ is a reference channel transfer function, and $v \neq -1$ or 0.

Another aspect of the present invention provides a transmitter that transmits on one of at least two channels in a communication system, wherein the transmitter transmits with a transmit power spectral density that is controlled to provide substantially equal data rates for each channel in the communication system.

In another aspect of the present invention, a power back-off method to mitigate the effects of FEXT noise in a communication system is provided. The communication system comprises at least one transmitter k. The transmitter k transmits to a central site via a corresponding channel. The method comprises controlling the transmit power spectral density of the transmitter k, $S(f,l_k)$, according to:

$$S(f, l_k) = G \cdot \left(\frac{l_k}{l_R}\right)^v \frac{S(f, l_R) \cdot |H(f, l_R)|^2}{|H(f, l_k)|^2} \text{ for } l_k \leq l_R$$

wherein $l_k$ is a channel length of the channel corresponding to the transmitter k, $H(f,l_k)$ is a channel transfer function of the channel corresponding to the transmitter k, $l_R$ is a reference channel length, $H(f,l_R)$ is a reference channel transfer function, $S(f,l_R)$ is a reference transmit power spectral density, and G has a value that depends on the channel length $l_k$ such that two or more data rate service areas are defined.

In another aspect of the present invention, a communication system comprising at least one transmitter k is provided. The transmitter transmits to the central site with a transmit power spectral density $S(f,l_k)$ via a corresponding channel. The channel has a length $l_k$ and a channel transfer function $H(f,l_k)$. The power spectral density $S(f,l_k)$ is governed according to:

$$S(f, l_k) = G \cdot \left(\frac{l_k}{l_R}\right)^v \frac{S(f, l_R) \cdot |H(f, l_R)|^2}{|H(f, l_k)|^2} \text{ for } l_k \leq l_R$$

where $l_R$ is a reference channel length, $H(f,l_R)$ is a reference channel transfer function, $S(f,l_R)$ is a reference transmit power spectral density, and G has a value that depends on the channel length $l_k$ such that two or more data rate service areas are defined.

Another aspect of the present invention provides a transmitter that transmits on one of at least two channels in a communication system. The transmitter transmits with a transmit power spectral density $S(f,l_k)$ according to:

$$S(f, l_k) = G \cdot \left(\frac{l_k}{l_R}\right)^v \frac{S(f, l_R) \cdot |H(f, l_R)|^2}{|H(f, l_k)|^2} \text{ for } l_k \leq l_R$$

wherein $l_k$ is a channel length of the channel that the transmitter transmits on, $H(f,l_k)$ is a channel transfer function of the channel that the transmitter transmits on, $S(f,l_R)$ is a reference transmit power spectral density, $l_R$ is a reference channel length, $H(f,l_R)$ is a reference channel transfer function, and G has a value that depends on the channel length $l_k$ such that two or more data rate service areas are defined.

DETAILED DESCRIPTION OF THE INVENTION

The present invention provides a power back-off method to mitigate far-end crosstalk interference between channels in a communication system. The method allows for control over the SNR of the channels by trading SNR on shorter channels against SNR on the longer channels. Thus, the present invention can provide for substantially equalized SNR and, hence, substantially equalized data rates for all channel lengths. The present invention generalizes the reference length and equalized FEXT methods to thereby provide the control of SNR/data rates. While the present invention is preferably implemented in a VDSL environment, as will be apparent to one of skill in the art, the principles of the present invention, however, can be used in any FEXT dominated environment.

The power back-off method according to the present invention is governed by the following relationship:

$$\frac{S(f, l_k) \cdot |H(f, l_k)|^2}{l_k^v} = \frac{S(f, l_R) \cdot |H(f, l_R)|^2}{l_R^v} \text{ for } l_k \leq l_R \quad (1)$$

Thus, for the power back-off method according to the present invention, the transmit power spectral density of each interferer k is:

$$S(f, l_k) = \left(\frac{l_k}{l_R}\right)^v \frac{S(f, l_R) \cdot |H(f, l_R)|^2}{|H(f, l_k)|^2} \text{ for } l_k \leq l_R \quad (2)$$

(2)

where $l_k$ is a channel length of the channel corresponding to the transmitter k, $H(f,l_k)$ is a channel transfer function of the channel corresponding to the transmitter k, $l_R$ is a reference channel length, $H(f,l_R)$ is a reference channel transfer function, $S(f,l_R)$ is a reference transmit power spectral density, and $v \neq -1$ or 0. As with the reference length and equalized FEXT methods, the reference transmit power spectral density is typically set to the maximum allowed transmit power spectral density, the reference channel length is typically defined by the network operator, the reference transfer function, and $H(f,l_k)$, is calculated based on the estimation of the reference loop length and of the type of wire used in the system.

It should be noted that equation (2) provides a generalization of the reference length and equalized FEXT methods. The case $v=0$ corresponds to the reference length method, while the case $v=-1$ corresponds to the equalized FEXT method. However, neither the equalized FEXT or reference length methods provide for control of the upstream data rates by trading between data rates for short loops against data rates for long loops.

By generalizing these methods, however, such a trade-off can be effectuated. As can be seen, the power spectral density of the interferer k, $S(f,l_k)$, is reduced by the ratio $(l_k/l_R)^v$. This allows the SNR of longer loops to be increased at the expense of shorter data loops and vice versa by adjusting the exponent $v$, which provides greater control of the upstream SNR distribution and, hence, upstream data rates.

Figure 4:
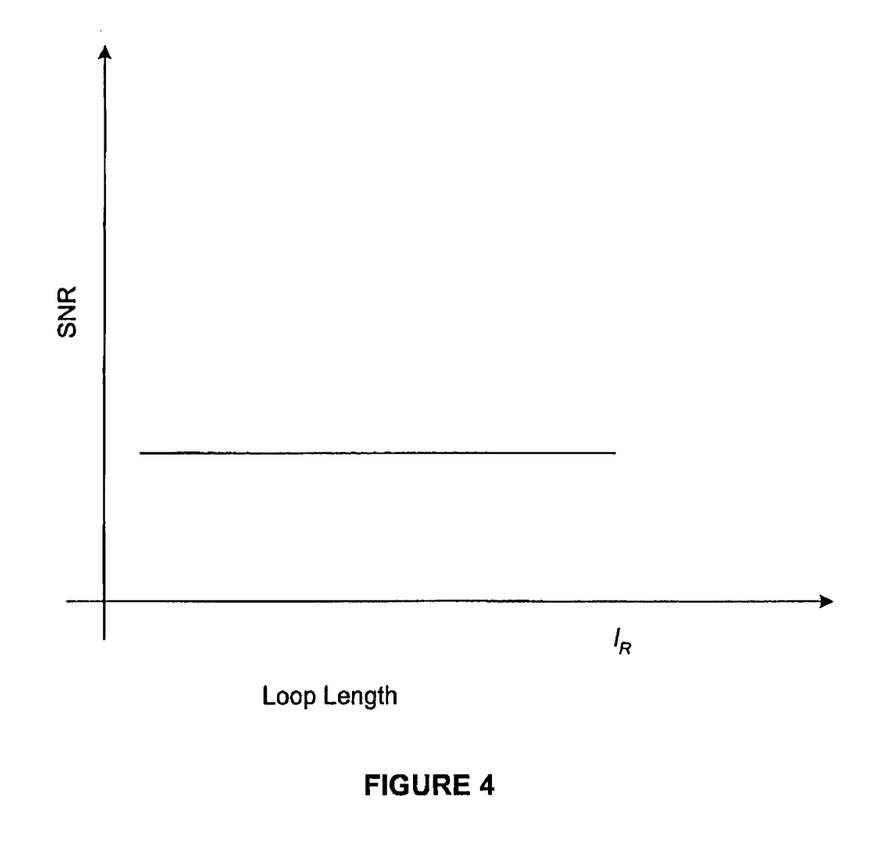
FIG. 4 illustrates a distribution of the signal to noise ratio (SNR) and the data rate as a function of loop length for an equalized SNR power back-off method.

Advantageously, this allows for a power back-off method that provides substantially equal SNR (and, hence, data rate) for each loop regardless of the loop length. This will be referred to as the equalized SNR method. Substantially equal SNR is achieved by setting the exponent $v$ close to one. The distribution of the SNR (and the data rate) as a function of loop length for $v$ close to one looks similar to that shown in FIG. 4.

Simulations indicate that an exponent value of 0.95 may be optimal for equalized SNR, i.e. provide maximum flatness of the SNR vs. loop length curve. Other values around 0.95, however, may provide an optimal solution depending on the system. For instance, exponent values of one or somewhat larger will increase the signal to noise ratio on longer loops, which may be desirable because the long loops have a tendency to behave worse than theoretical models.

Figure 5:
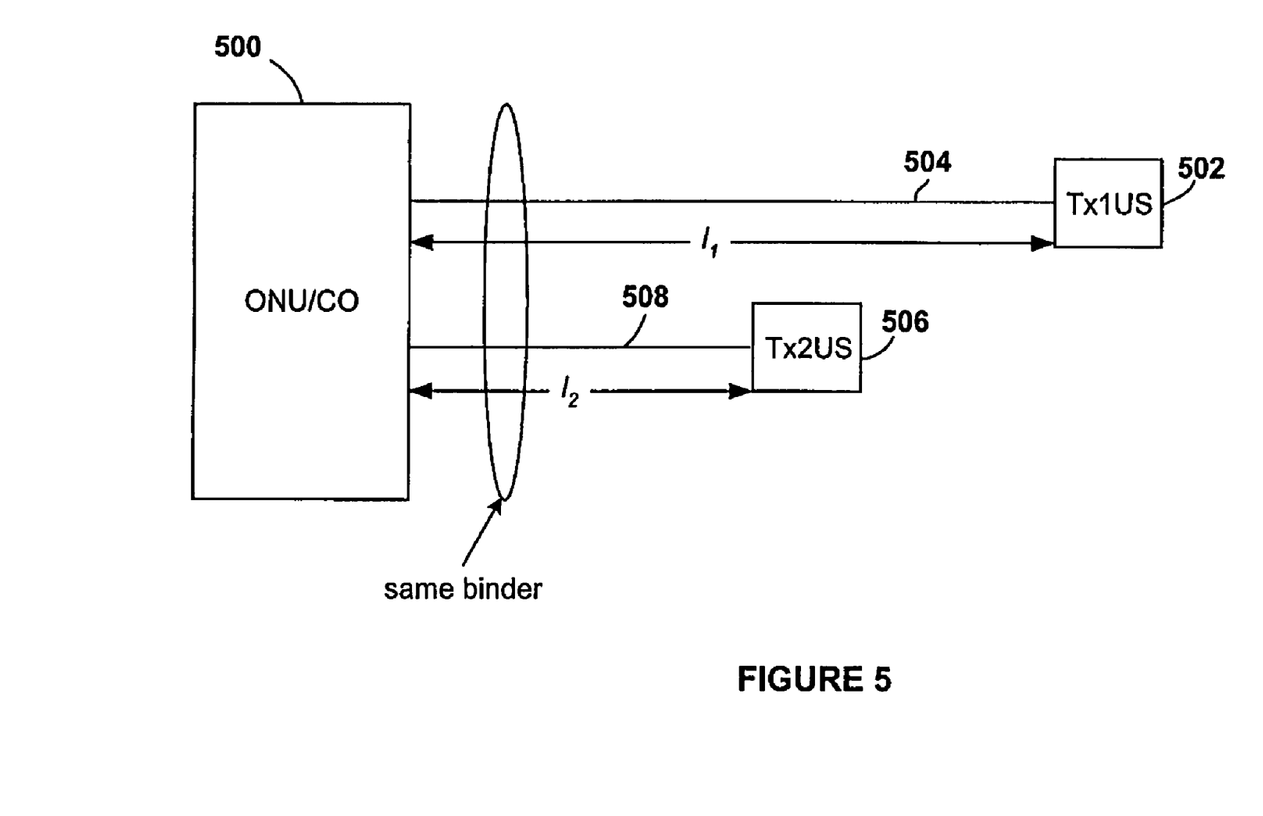
FIG. 5 illustrates an exemplary environment in which the power back-off method of the present invention is used.

FIG. 5 illustrates an exemplary environment in which the power back-off method of the present invention is used.

VDSL transmitters 502 and 506 are each on a loop in the same cable binder to a central site 500, i.e. ONU or CO. The loop length of loop 504 that transmitter 502 is coupled to is $l_k=l_1$ and the transfer function of loop 504 is $H(f,l_1)$. Accordingly, transmitter 502 transmits upstream to ONU/CO 500 with a power spectral density, $S(f,l_1)$, as follows:

$$S(f, l_1) = \left(\frac{l_1}{l_R}\right)^v \frac{S(f, l_R) \cdot |H(f, l_R)|^2}{|H(f, l_1)|^2} \text{ for } l_k \leq l_R \quad (3)$$

Similarly, transmitter 506 transmits upstream to ONU/CO on loop 508 of length $l_2$ with a transmit power spectral density $S(f,l_2)$ as follows:

$$S(f, l_2) = \left(\frac{l_2}{l_R}\right)^v \frac{S(f, l_R) \cdot |H(f, l_R)|^2}{|H(f, l_2)|^2} \text{ for } l_k \leq l_R. \quad (4)$$

In both cases $\upsilon \neq -1$ or $0$. As previously described, when equalized SNR is desired, i.e. when a service provider wants to provide a substantially equal data rate for all loop lengths, $\upsilon$ is set close to one.

Also, a service provider may be interested in offering higher data rates for units (customers) that are closer to the ONU/CO at the expense of those that are at a longer distance from the ONU/CO. Accordingly, the present invention provides a manner to provide two or more data rate service areas using a method derived from equation (2). The power back-off method according to the present invention that provides for two or more areas of service with different data rates is governed by the relationship:

$$\frac{S(f, l_k) \cdot |H(f, l_k)|^2}{l_k^v} = G \cdot \frac{S(f, l_R) \cdot |H(f, l_R)|^2}{l_R^v} \text{ for } l_k \leq l_R \quad (5)$$

For the case of two service areas, an intermediate loop length value, $l_{R1}$, is used to delineate the two service areas, and the above relationship is used to provide for two reference length equations; one for loops of lengths less than $l_{R1}$, the other for the rest. Thus, to provide two areas of service with different data rates, the transmit power spectral density of each interferer k is:

$$S(f, l_k) = G \cdot \left(\frac{l_k}{l_R}\right)^v \frac{S(f, l_R) \cdot |H(f, l_R)|^2}{|H(f, l_k)|^2} \text{ for } l_k \leq l_R \quad (6)$$

where $G>1$ for loop lengths shorter than $l_{R1}$ (i.e., $l_k<l_{R1}$) to the ONU/CO and $G=1$ for the rest. That is, the transmit PSD for the shorter loop length ($<l_{R1}$) is increased by a gain factor G compared with the longer loop length ($>l_{R1}$). This introduces a discontinuity of $10 \log_{10}(G)$ db in the value of the SNR at the loop length $l_{R1}$. This increases the signal power for shorter loops by a factor of G compared with the rest. Thus, the noise contribution of longer loops will affect the SNR on shorter loops in a lesser measure than they would without the gain. This leads to an increase of data rate on the shorter loops. The reverse is also true, i.e. the data rate on longer loops will be adversely affected by the increase in transmit PSD on shorter loops.

By modifying the gain factor G, the desired balance in data rates between two service areas can be achieved. Also, as will be readily apparent to one of skill in the art, this method is easily extended to more than two service areas by defining different gain factors and loop lengths for each service area.

Figure 6:
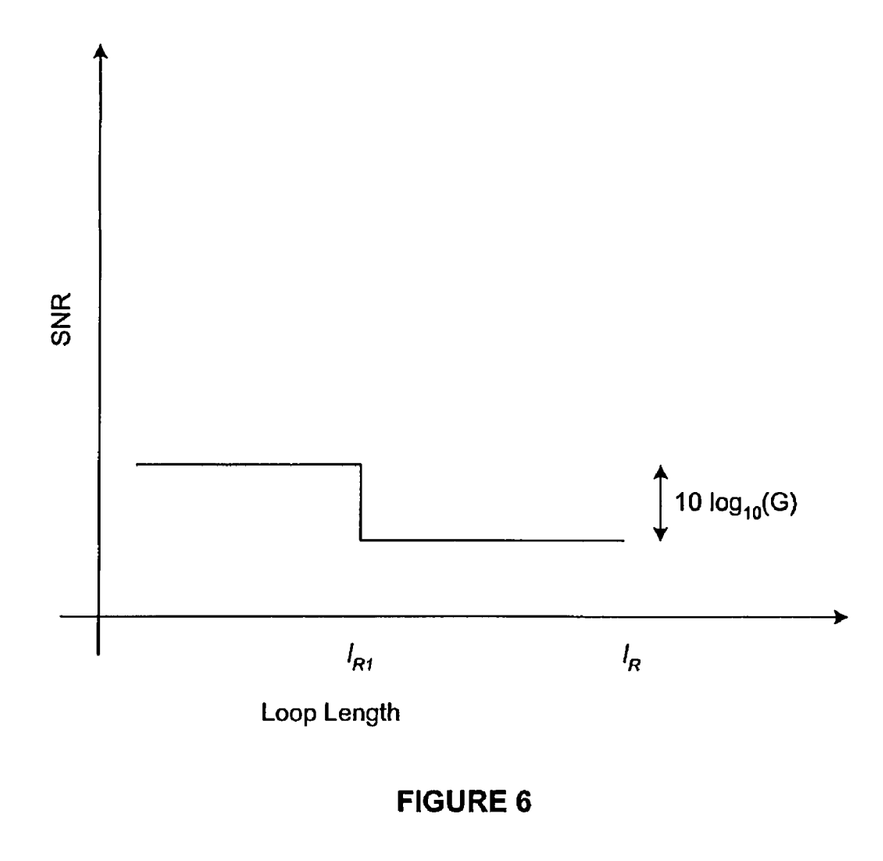
FIG. 6 illustrates a distribution of the signal to noise ratio (SNR) and data rate as a function of loop length for an equalized SNR power back-off method with two areas of data rate service.
Figure 7:
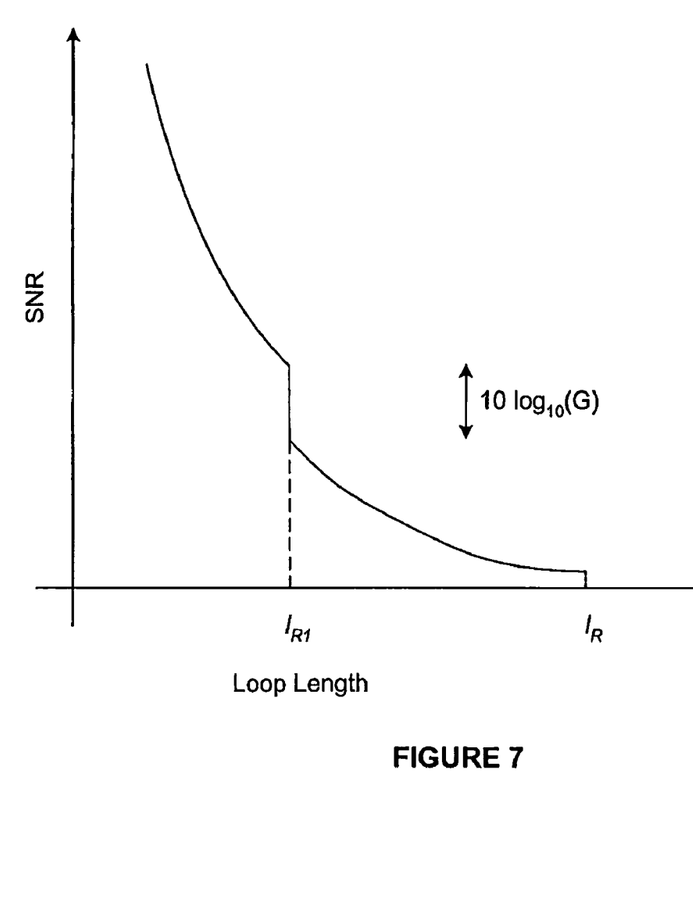
FIG. 7 illustrates a distribution of the signal to noise ratio (SNR) and, hence, the data rate as a function of loop length for an reference length power back-off method with two areas of data rate service.

This method is advantageously used with the equalized SNR method by setting $\upsilon$ close to one. The corresponding SNR (data rate) distribution for this case is shown in FIG. 6. It should be noted that the principle of this method is not only useful for the equalized SNR method, but can also be used for other methods covered by equation (2). For instance, for the reference length method (i.e., $\upsilon=0$), a two-service area is achieved by the following method:

$$S(f,l_k) \cdot |H(f,l_k)|^2 = G \cdot S(f,l_R) \cdot |H(f,l_R)|^2 \text{ for } l_k \leq l_R \quad (7)$$

where $G>1$ for loop lengths shorter than $l_{R1}$ (i.e., $l_k<l_{R1}$) to the ONU/CO and $G=1$ for the rest. The corresponding SNR (data rate) distribution for this case is shown in FIG. 7.

Figure 8:
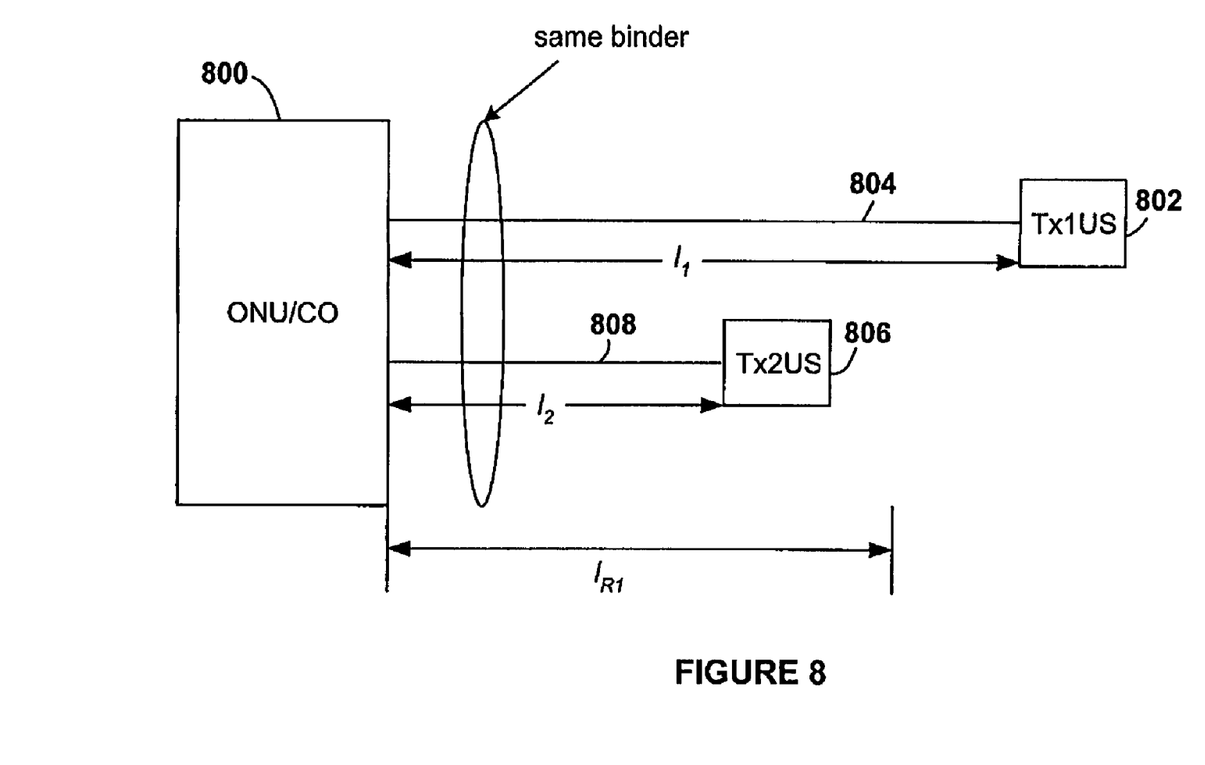
FIG. 8 illustrates an exemplary environment in which the two-data service area power back-off method of the present invention is used.

FIG. 8 illustrates an exemplary environment in which the two-data service area power back-off method of the present invention is used. Similar to the environment of FIG. 5, VDSL transmitters 802 and 806 are each on a loop in the same cable binder to a central site 800, i.e. ONU or CO. The loop length of loop 804 that transmitter 802 is coupled to is $l_k=l_1$ and the transfer function of loop 804 is $H(f,l_1)$. A loop length of $l_{R1}$ delineates the data rate service areas. The loop length $l_1$ of loop 804 is greater than the loop length $l_{R1}$. Accordingly, transmitter 802 transmits upstream to ONU/CO 800 with a power spectral density $S(f,l_1)$ as follows:

$$S(f, l_1) = \left(\frac{l_1}{l_R}\right)^v \frac{S(f, l_R) \cdot |H(f, l_R)|^2}{|H(f, l_1)|^2} \quad (8)$$

The loop length $l_2$ of loop 808, however, is less than the loop length $l_{R1}$. Accordingly, using $G=2$ for $l_k<l_{R1}$ as an example, transmitter 806 transmits upstream to ONU/CO 800 with a transmit power spectral density $S(f,l_2)$ as follows:

$$S(f, l_2) = 2 \cdot \left(\frac{l_2}{l_R}\right)^v \frac{S(f, l_R) \cdot |H(f, l_R)|^2}{|H(f, l_2)|^2}. \quad (9)$$

Although the present invention has been shown and described with respect to several preferred embodiments thereof, various changes, omissions and additions to the form and detail thereof, may be made therein, without departing from the spirit and scope of the invention.

What is claimed is:

1. A power back-off method to mitigate the effects of far-end crosstalk (FEXT) noise in a communication system comprising at least one transmitter k, the transmitter k transmitting to a central site via a corresponding channel, the method comprising:

determining a transmit power spectral density for the transmitter k, $S(f,l_k)$, according to:

$$S(f, l_k) = \left(\frac{l_k}{l_R}\right)^v \frac{S(f, l_R) \cdot |H(f, l_R)|^2}{|H(f, l_k)|^2} \text{ for } l_k \leq l_R$$

wherein $l_k$ is a channel length of the channel corresponding to the transmitter k, $H(f,l_k)$ is a channel transfer function of the channel corresponding to the transmitter k, $l_R$ is a reference channel length, $H(f,l_R)$ is a reference channel transfer function, $S(f,l_R)$ is a reference transmit power spectral density, and $\upsilon \neq -1$ or 0; and controlling transmitter k to transmit at the transmit power spectral density $S(f,l_k)$.

2. A power back-off method, as per claim 1, wherein $\upsilon$ is set close to one to provide substantially equalized data rates for channels of the communication system.

3. A power back-off method, as per claim 2, wherein $\upsilon$ is set to approximately 0.95.

4. A power back-off method, as per claim 1, wherein said communication system is a VDSL system.

5. A communication system comprising:

at least one transmitter k, the transmitter transmitting to the central site with a transmit power spectral density $S(f,l_k)$ via a corresponding channel, wherein the channel has a length $l_k$ and a channel transfer function $H(f,l_k)$; and wherein the transmit power spectral density $S(f,lk)$ is governed according to:

$$S(f, l_k) = \left(\frac{l_k}{l_R}\right)^\upsilon \frac{S(f, l_R) \cdot |H(f, l_R)|^2}{|H(f, l_k)|^2} \text{ for } l_k \leq l_R$$

where $l_R$ is a reference channel length, $H(f,l_R)$ is a reference channel transfer function, $S(f,l_R)$ is a reference transmit power spectral density, and $\upsilon \neq -1$ or 0.

6. A communication system, as per claim 5, wherein $\upsilon$ is set close to one to provide substantially equalized data rates for channels of the communication system.

7. A communication system, as per claim 6, wherein $\upsilon$ is set to approximately 0.95.

8. A communication system, as per claim 5, wherein said communication system is a VDSL system.

9. A transmitter that transmits on a channel in a communication system comprising:

a transmitting element that transmits with a transmit power spectral density $S(f,l_k)$ that is controlled to provide substantially equal data rates for each channel in the communication system, said transmit power spectral density $S(f,l_k)$ is defined as:

$$S(f, l_k) = \left(\frac{l_k}{l_R}\right)^\upsilon \frac{S(f, l_R) \cdot |H(f, l_R)|^2}{|H(f, l_k)|^2} \text{ for } l_k \leq l_R$$

wherein $l_k$ is a channel length of the channel that the transmitter transmits on, $H(f,l_k)$ is a channel transfer function of the channel that the transmitter transmits on, $S(f,l_R)$ is a reference transmit power spectral density, $l_R$ is a reference channel length, $H(f,l_R)$ is a reference channel transfer function, and $\upsilon$ is close to one.

10. A transmitter that transmits on a channel in a communication system, as per claim 9, wherein $\upsilon$ is set to approximately 0.95.

11. A transmitter that transmits on a channel in a communication system, as per claim 9, wherein the transmitter and the channel are part of a VDSL system.

12. A power back-off method to mitigate the effects of far-end crosstalk (FEXT) noise in a communication system comprising at least one transmitter k, the transmitter k transmitting to a central site via a corresponding channel, the method comprising:

determining the transmit power spectral density for the transmitter k, $S(f,l_k)$, according to:

$$S(f, l_k) = G \cdot \left(\frac{l_k}{l_R}\right)^\upsilon \frac{S(f, l_R) \cdot |H(f, l_R)|^2}{|H(f, l_k)|^2} \text{ for } l_k \leq l_R$$

wherein $l_k$ is a channel length of the channel corresponding to the transmitter k, $H(f,l_k)$ is a channel transfer function of the channel corresponding to the transmitter k, $l_R$ is a reference channel length, $H(f,l_R)$ is a reference channel transfer function, $S(f,l_R)$ is a reference transmit power spectral density, and G has a value that depends on the channel length $l_k$ such that two or more data rate service areas are defined; and controlling transmitter k to transmit at the transmit power spectral density $S(f,l_k)$.

13. A power back-off method, as per claim 12, wherein G>1 for channel length $l_k$ less than a length $l_{R1}$ that delineates a first data rate service area and G=1 for channel length $l_k$ greater than the length $l_{R1}$ so as to define a second data rate service area.

14. A power back-off method, as per claim 12, wherein $\upsilon$ is set close to one to provide substantially equalized data rates for channels of the communication system.

15. A power back-off method, as per claim 14, wherein $\upsilon$ is set to approximately 0.95.

16. A power back-off method, as per claim 12, wherein said communication system is a VDSL system.

17. A communication system comprising:

at least one transmitter k, the transmitter transmitting to the central site with a transmit power spectral density $S(f,l_k)$ via a corresponding channel, wherein the channel has a length $l_k$ and a reference channel transfer function $H(f,l_k)$; and wherein the transmit power spectral density $S(f,lk)$ is governed according to:

$$S(f, l_k) = G \cdot \left(\frac{l_k}{l_R}\right)^\upsilon \frac{S(f, l_R) \cdot |H(f, l_R)|^2}{|H(f, l_k)|^2} \text{ for } l_k \leq l_R$$

where $l_R$ is a reference channel length, $H(f,l_R)$ is a reference channel transfer function, $S(f,l_R)$ is a reference transmit power spectral density, and G has a value that depends on the channel length $l_k$ such that two or more data rate service areas are defined.

18. A communication system, as per claim 17, wherein G>1 for channel length $l_k$ less than a length $l_{R1}$ that delineates a first data rate service area and G=1 for channel length $l_k$ greater than the length $l_{R1}$ so as to define a second data rate service area.

19. A communication system, as per claim 17, wherein $\upsilon$ is set close to one to provide substantially equalized data rates for channels of the communication system.

20. A communication system, as per claim 19, wherein $\upsilon$ is set to approximately 0.95.

21. A communication system, as per claim 17, wherein said communication system is a VDSL system.

* * * * *